Sept. 11, 1962 P. M. WRIGHT ETAL 3,054,104
FREQUENCY MODULATED RADAR SYSTEMS
Filed May 2, 1956 2 Sheets-Sheet 1
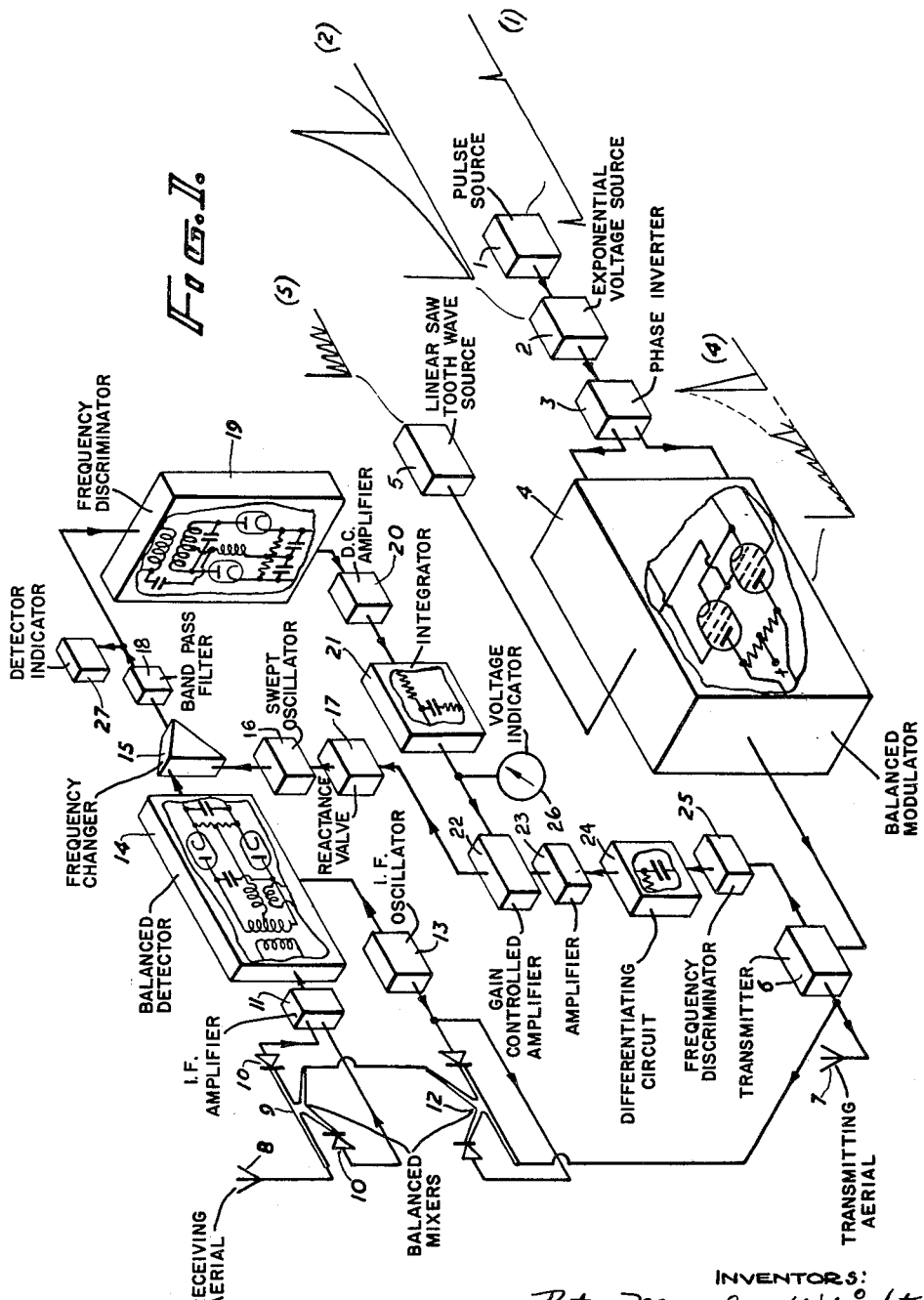
INVENTORS:
Peter Maurice Wright
and
Percy Samuel Brandon
BY: Baldwin + Wight
ATTORNEYS

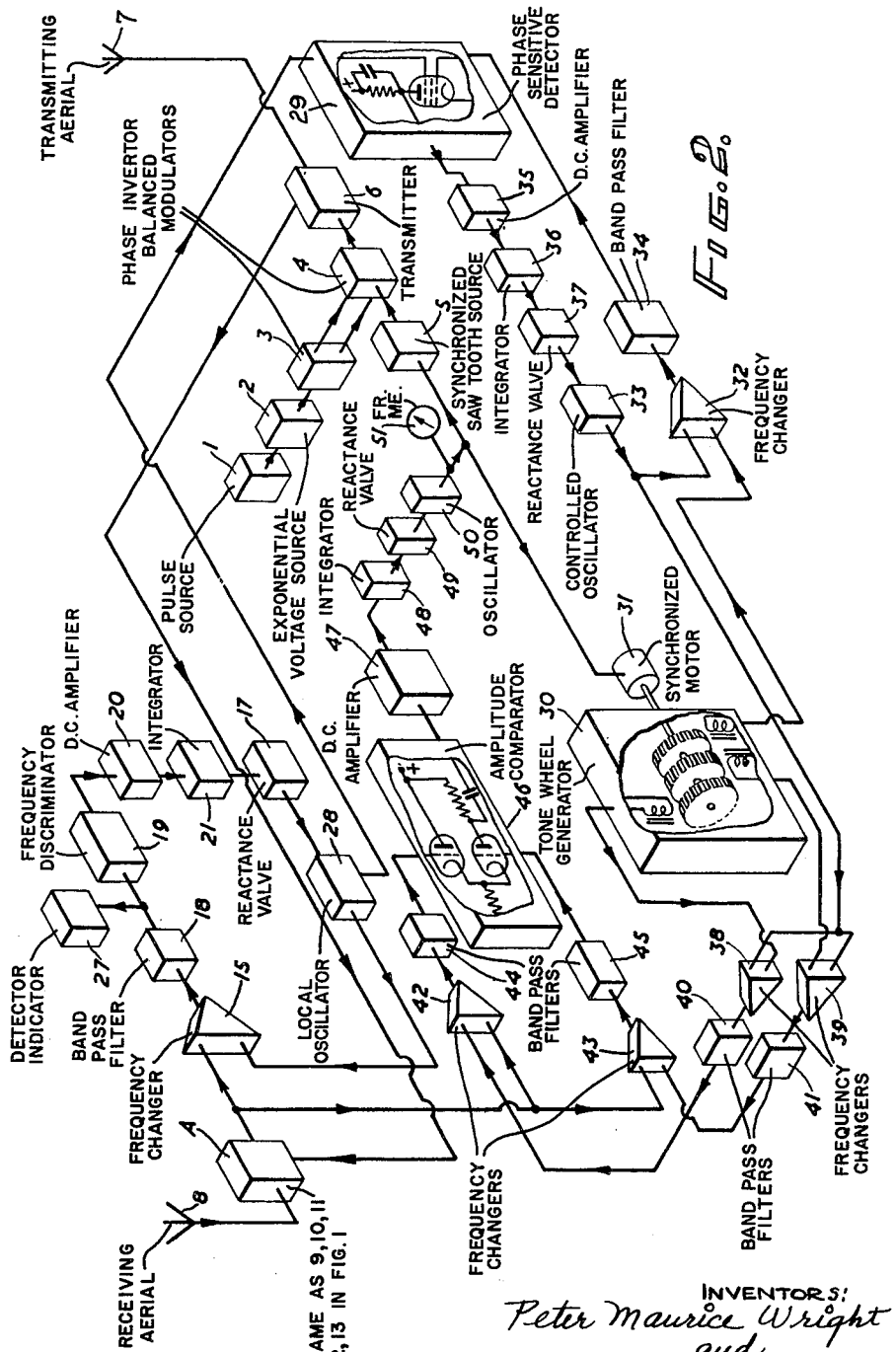

3,054,104
FREQUENCY MODULATED RADAR SYSTEMS
Peter Maurice Wright and Percy Samuel Brandon, Essex, England, assignors to Marconi's Wireless Telegraph Company Limited, London, England, a British company
Filed May 2, 1956, Ser. No. 582,263
Claims priority, application Great Britain May 9, 1955
1 Claim. (Cl. 343—14)

This invention relates to frequency modulated radar systems that is to say to systems of the kind in which the transmitter sends out frequency modulated continuous high frequency waves as distinct from those systems—termed pulsed radar systems—in which the transmitter sends time-separated discrete pulses of high frequency.

It is often required to provide a radar system which will rapidly search a range bracket to ascertain whether a major target is present, find it if it is present, and indicate its range to a high degree of resolution. The term "bracket" is here used to indicate a zone of ranges in which the target may lie. This requirement of rapid searching of what may be an extended range bracket to give the range of a target to a high degree of resolution is one that is exceedingly difficult to satisfy and, so far as the present applicants are aware it has not so far been satisfied by any known frequency modulated radar system without the use of very complex apparatus involving the provision of a great number of sharply selective selective circuits.

In what is probably the best known form of frequency modulated radar system the transmitter is frequency modulated in accordance with a substantially linear saw-tooth law having a pre-determined repetition frequency, the transmitted frequency being linearly deviated from one pre-determined limiting frequency to another and then returned rapidly to the said one limiting frequency. Received echo signals from a target are mixed with signals from the transmitter to produce beat notes. Obviously the beat note thus produced will depend in frequency upon the range of the echoing target. The beat note energy is mixed with energy from a swept local oscillator, i.e. an oscillator whose frequency is swept (usually in accordance with a saw-tooth law) between pre-determined limits of frequency and the resultant from mixing is applied as input to a band pass filter. The resultant thus obtained from a given beat note frequency, i.e. from a target of given range, will only pass the filter when the swept oscillator frequency is such as to transform the beat frequency to one which is within the pass band of said filter and therefore the range of a target can be ascertained in terms of the swept oscillator frequency for which the filter gives an output. Clearly the narrower the pass band of the filter the better the range resolution obtained but also the narrower the said pass band the larger the time which must be allowed for it to build up an output signal in response to an input signal within that pass band. This type of system—sometimes called the swept oscillator analyser type—has the defect therefore, that it is inherently slow in range searching and if an extended range bracket has to be searched to find a target and give its range with high resolution, the tmie taken is inherently long since the speed of sweep of the swept oscillator must be slow enough to be sure that a resultant signal derived by said oscillator from the beat frequency due to a particular target will be present at the input of the filter long enough to give a useful output.

This defect of the swept oscillator analyser type has long been known and it has been proposed to avoid it by using what may be termed multiple analysis of beat frequency. In radar systems of this nature the beat frequency energy resulting from mixing received echo signals with energy from the transmitter is fed to a large number of frequency selective circuits with their inputs in parallel, each circuit being a band pass circuit with a pass band different from those of the others and the circuits between them covering a beat frequency spectrum of width corresponding to the range bracket to be searched. With such a system the narrower the pass band of each individual selective circuit the better the range solution but, of course, the greater the number of such circuits required for a given range bracket. Multiple analysis of beat frequency thus avoids the slowness of search of swept oscillator analysis but only at the cost of great complexity of apparatus—in a practical case there may easily be a thousand or more frequency selective circuits required.

Yet another known form of frequency modulated continuous wave radar system is that employing the so-called "synchronous" method of ranging. If the transmitter is frequency modulated in accordance with a saw-tooth law and the echo time of a target (i.e. the time of propagation to the target and back) is exactly equal to the repetition period of the saw-tooth the received echo signal will be of the same frequency as that being transmitted at the moment of reception and the beat frequency obtained by mixing the echo signal with transmitter energy will be zero. It is therefore possible to search in range by adjusting the repetition period until the obtaining of zero beat indicates equality as between repetition period and echo time and when this occurs range may be ascertained in terms of the adjusted setting of the repetition period. This type of system avoids the complexity of the multiple analysing type of system but obviously has the same defect as the swept oscillator analysing type, namely that it is inherently slow in range searching becoming increasingly slower as the range resolution required increases, for the more closely the ascertainment of zero beat frequency that is required the longer must the beat frequency energy be applied to the phase comparator, frequency discriminator or other device utilised to measure the beat frequency.

The invention seeks to provide frequency modulated radar system in which range searching with high resolution is automatically accomplished much more rapidly than is possible with the usual known swept oscillator analysing and synchronous ranging types of system but without requiring the multiplicity of frequency selective circuits required by the multiple analysing type of system.

According to this invention a frequency modulated continuous wave radar system comprises at the transmitter means for transmitting continuous waves, means for cyclically varying the frequency of the transmitted waves, means for cyclically varying the rate of change of frequency of said transmitted waves to increase said rate over a succession of cycles of frequency variation by varying the deviation of the transmitter, means for receiving reflected echo signals, means for mixing reflected echo signal energy with energy derived from the transmitter to produce beat frequency energy and means responsive to the beat frequency energy and controlled in dependence upon the rate of change of the transmitted frequency for determining the range of a reflecting target with a resolution which increases as the said rate of change increases.

The speed of range searching achieved by the invention arises from the fact that the range resolution is increased during an operation of searching becoming high only at the end of the search, i.e. at the end of a cycle of rate of change variation. Accordingly the speed of search is high at the beginning and becomes low only at the end. The total time taken to search is, therefore, much reduced as compared to that taken by a known swept oscillator analyser or synchronous ranging type of radar system in which the range resolution is constant throughout the search.

It may be shown from theoretical considerations that maximum saving of time of search is obtained if the rate of change of transmitted frequency from minimum to maximum is in accordance with an exponential law. This is therefore preferred, though it is not essential.

Theoretically variation of the rate of change of transmitted frequency may be effected by varying the deviation of the transmitter, i.e. by varying the spacing of the limits between which the frequency is varied in successive cycles of variation; or by varying the period of the cycle of frequency variation from one cycle to the next; or by varying both the deviation and the period. In practice, however, it is considered most convenient to vary the deviation to vary the rate of change of frequency and in the specific embodiments to be described later herein this is done.

As will be readily understood, the beat frequency produced from a target at a given range will vary as the rate of change of transmitted frequency varies. Accordingly one way of carrying out the invention is to mix the beat frequency energy with energy from a swept local oscillator and apply the resultant to a fixed frequency band pass filter whose output is fed to a frequency discriminator connected to vary the swept oscillator frequency towards a value at which the resultant of mixing accords with the centre of the pass band of said filter, variation of the resolution with the rate of change of transmitted frequency being effected by making the degree of control exercised by the discriminator dependent on the said rate of change. This form of embodiment may be regarded as of the swept oscillator analysing type, the swept oscillator being automatically controlled to lock on to the target range with a resolution which increases as the rate of change of transmitted frequency increases. In this embodiment the range may be ascertained by observing the output from the discriminator or the frequency from the swept oscillator.

It is also possible to carry out the invention by using the synchronous ranging method. In an embodiment of this nature a first oscillator replaced the swept oscillator of the previous embodiment and there is a first mixer associated therewith, a fixed frequency filter and a frequency discriminator controlling the first oscillator all as in the first embodiment except that the degree of control of the first oscillator exercised by the discriminator is not made dependent on the rate of change of the transmitted frequency. Instead a second oscillator is employed to control, in dependence upon its output frequency, both the repetition period of the transmitter and the frequency of a local generator adapted to provide three output frequencies one of which is mixed with that from a third oscillator to produce a resultant which is phase compared with the first oscillator output in a phase comparator controlling the third generator to maintain the two inputs to said comparator with zero phase difference. The generator also provides two other frequencies, similarly controlled by the second oscillator and symmetrically on opposite sides of that which is mixed with the third oscillator output. These two other frequencies are mixed with output from the third oscillator in separate mixers whose outputs are in turn mixed in separate further mixers with input to the first frequency changer, i.e. that associated with the first oscillator. The two resultants are fed to an amplitude comparator whose output controls the second oscillator in a direction to establish and maintain amplitude equality.

With this embodiment, which is especially adapted to find and range a moving target the apparatus will set itself so that the input to the first frequency changer (that associated with the first oscillator) consists of a Doppler frequency due to target motion with frequency modulation side bands due to the transmitter repetition frequency. The first oscillator will lock on to the Doppler frequency and the third oscillator will lock on to a frequency differing from the first oscillator frequency by an amount dependent on the central one of the three frequencies from the three-frequency generator. The two other frequencies from this generator are so spaced on either side of the central one that the resultants produced by mixing them with the third oscillator output are two frequencies equal respectively to the sum and difference of the first oscillator frequency and the transmitter repetition frequency. These sum and difference frequencies are mixed with the Doppler and side bands to provide the two inputs to the amplitude comparator controlling the second oscillator which will accordingly be varied in frequency until its period is substantially equal to the echo time of the target. A meter reading the frequency of the second oscillator may therefore be calibrated in range. When the deviation of the transmitter is small the Doppler side bands will be of small amplitude and the range resolution small but the side band amplitudes increase and therefore the effective sensitivity of action of the amplitude comparator and in consequence the range resolution increase as the said deviation increases and, of course, the rate of change of transmitted frequency increases with deviation.

The invention is illustrated in the accompanying drawings which show two embodiments diagramatically.

Referring to FIGURE 1, 1 represents any known pulse source having a wave form as shown at (1) and having a frequency equal to a desired fraction, for example 1/20 of the nominal repetition frequency ($f_r$) of the transmitter. 2 is a source of voltage increasing exponential with time and of form known per se: it may be, for example, as described in the M.I.T. Radiation Laboratory Series, vol. 19, page 299. In response to each pulse from 1 it produces a voltage wave form as indicated at (2). The output from 2 is fed through any known phase invertor network 3 to transform it with a push-pull output which is applied between the suppressor grids of two valves in a known balanced modulator circuit 4. A linear saw tooth wave source 5 of the nominal repetition frequency $f_r$, producing a wave as shown at (5) supplies its output to the control grids of the two valves at 4. The output from 4 will be as represented at (4). The transmitter proper 6 is modulated in frequency in accordance with the form (4) so that the frequency transmitted at any instant is proportional to the instantaneous amplitude of the wave form (4). For example the transmitter 6 may be a Klystron oscillator with the wave form (4) applied to its reflector electrode. The transmitting aerial is indicated at 7.

Echo signals received on an aerial 8 (a separate receiving aerial is shown for the sake of simplicity though a common transmitting-receiving aerial could be used in accordance with well known practice) are fed to a known balanced mixer, shown conventionally as a so-called rat-race 9 whose output crystals 10 feed as in the usual way to an intermediate frequency amplifier 11. The second input to the rat-race 9 is derived from a second rat-race 12 which receives input to one arm from transmitter 6 and parallel input to two other arms from an intermediate frequency oscillator 13. Output from this oscillator is mixed in with output from the amplifier 11 in a known balanced detector 14. As so far described the receiver portion of the apparatus is all well known and a beat note representative of the range of an echoing target will appear at the output from detector 14. This beat note will vary in frequency (apart from any variation due to change of target range) due to the variation in the rate of change of transmitted frequency caused by the control exercised by source 2.

This spectrum is applied to a known frequency changer 15 whose second input is derived from a swept oscillator 16 whose instantaneous frequency is controlled by a known reactance valve 17 providing a variable effective reactance in a frequency determining circuit of the oscillator 16 in known manner. The output from frequency changer 15 is fed to a band-pass filter 18 having its centre of frequency selected at a value suitably higher than the maximum beat frequency to be expected. Output from this filter is fed to a frequency discriminator 19 of known form adapted to produce zero output in response to an input equal to the centre frequency of the filter 18 but, in response to any other input frequency within its operating range, a D.C. output of sign and magnitude respectively dependent on the direction and extent of the deviation of said input frequency from the centre frequency of the band pass filter. The D.C. output is amplified by a D.C. amplifier 20 in turn followed by an integrating network 21 the output of which is fed as gain controlling potential to a gain controlled amplifier 22. The output from the amplifier 22 controls the reactance manifested by the reactance valve 17 and the input to said amplifier is derived through an amplifier 23 preceded by a differentiating circuit 24 fed from a frequency discriminator 25 adapted to provide zero ouput in response to some pre-determined input frequency within the deviation range of the transmitter and to provide in response to any other input frequency within its operating range a D.C. output of polarity and magnitude dependent on the direction and extent of the deviation of said input frequency from said pre-determined input frequency. The output from the differentiator 24 will be a measure of the rate of change of the transmitter frequency. The discriminator 25 must, of course, be so designed as to be responsive to frequency and not to any amplitude changes that may occur at the transmitter.

The apparatus operates as follows: The input to the amplifier 22 will be proportional to the rate of change of the transmitted frequency and the control input to the reactance valve 17 will also be proportional to that rate of change but with a factor of proportionality which is itself dependent on the output from the discriminator 19. Accordingly, if an echoing target produces a beat frequency input to the frequency changer 15, the control of the local oscillator 16 by the differential output from the discriminator 25 applied with a factor controlled by the output from the discriminator 19 ensures the maintenance of a fixed frequency difference between the varying beat frequency input to frequency changer 15 and the oscillations from swept oscillator 16. The proportional factor of control provided by the discriminator 19 will be a measure of the range of the target and a suitably calibrated voltage responsive indicator 26 provided as shown may be used to indicate target range. 27 is a detector and lamp or other indicator unit whose purpose is merely to indicate that a target is present.

The speed at which the described system of FIGURE 1 will ascertain the range of a target arises from the fact that, due to the variation of the width of the frequency spectrum over which the transmitter frequency is varied, the effective range resolution is also varied. When the transmitter frequency is varied over the smallest width, i.e. during the first exponential saw tooth of wave form (4) the range resolution is correspondingly low. However, the automatic adjustment of the oscillator 16 during this part of wave form (4) prepares the said oscillator for closer adjustment during the period of better resolution which follows, i.e. during the next exponential saw tooth of wave form (4) . . . and so on until the final saw tooth of a cycle is reached, when the beat frequency is at its maximum, the local oscillator frequency from oscillator 16 is also at its maximum and the maximum range resolution is obtained. The exponential wave form from unit 2 is not essential—any wave form which will increase the transmitter deviation may, theoretically, be used—but it may be shown that optimum saving is obtained by using the exponential wave form. The speed of range searching is much higher than is obtainable when using the known sweeping method of analysis since, with that known method, the range resolution is constant throughout the search.

The system of FIGURE 1 (like other systems in accordance with this invention) is only suitable for use in those cases when only one target beat note is expected to be present at a time for if more than one beat note is present at a given moment the system will give the range of the strongest.

FIGURE 2 shows another embodiment of the invention which is especially advantageous where high speed moving targets are to be expected. A receiving aerial 8, rat race and crystals 9 and 10, intermediate frequency amplifier 11, balanced detector 14, balanced modulator 12 and intermediate frequency oscillator 13 are all provided and connected as in FIGURE 1, and accordingly, in order to simplify the drawing, are represented in FIGURE 2 merely as a block A and the aerial 8. Also, in the transmitting portion of the apparauts, there is a pulse source 1, exponential source 2, phase inverter 3, balanced modulator 4, saw tooth source 5, transmitter 6 and aerial 7 all again as in FIGURE 1 except that the saw tooth source 5 is synchronised as will be described later. Output from unit A hereinafter termed Doppler and side band output is fed into a feedback loop including frequency changer 15, band pass amplifier 18, frequency discriminator 19, D.C. amplifier 20, and integrator 21 all as in FIGURE 1 and a detector and lamp indicator 27 is provided, again as in FIGURE 1. The output from the integrator 21 is, however, fed directly to control the reactance manifested by a reactance valve 17 and included thereby in a frequency determining circuit of a local oscillator 28. This oscillator provides one output as the second input to the frequency changer 15 and another as one input to a phase sensitive detector 29 to be referred to later.

30 is a tone wheel generator providing three output frequencies respectively equal to $(n+1)f_r$, $(n-1)f_r$ and $nf_r$ where $f_r$ is the varying transmitter repetition frequency and $n$ is any whole number, for example 20. The tone wheel generator is driven by a synchronised motor 31 which is automatically synchronised so as to secure the generation of the required three frequencies as will be later described. One of the three frequencies $nf_r$ is fed to a frequency changer 32 whose second input consists of a frequency $f_2$ from an automatically controlled oscillator 33. The output from frequency changer 32 will therefore include the frequency $f_2+nf_r$ and this is selected by a band pass filter 34 and fed as one input to a known phase sensitive detector 29. As already explained the second input to this phase sensitive detector is provided from the oscillator 28. Call the frequency of this second input $f_1$. The phase sensitive detector operates in well known manner to provide zero output if $f_1=f_2+nf_r$ and is in phase therewith but if this in-phase condition of equality is not present there is a D.C. output of sign and magnitude dependent upon the sense and extent of departure from said condition. Output from unit 29 is amplified by a D.C. amplifier 35 and fed through an integrator 36 to a reactance valve 37 controlling the frequency of the oscillator 33. This oscillator will therefore be automatically controlled to maintain $f_2$ such that $f_1=f_2+nf_r$ and its output will therefore be of frequency $f_1-nf_r$. This frequency is mixed with the second frequency $(n+1)f_r$ from the tone wheel generator in a frequency changer 38 and with the third frequency $(n-1)f_r$ from said generator in a frequency changer 39. The output from each of these frequency changers is passed through a band pass filter 40 or 41, the former feeding into a frequency changer 42 and the latter into a frequency changer 43. The second inputs to frequency changers 42 and 43 are taken from the output of unit A and the outputs from these frequency changers are fed through band pass filters 44 and 45 having their mid-frequencies equal to that of the filter 18 to a known amplitude comparator circuit 46 which, in well known manner, provides one output if the two input amplitudes are the same and changes its output from this value in a direction and to an extent dependent upon the sense and extent of departure from the equality condition. Output from unit 46 is amplified in a D.C. amplifier 47, integrated by an integrator 48 and fed to a reactance valve 49 controlling an oscillator 50 whose output synchronises the motor 31 and also the saw tooth generator 5.

Suppose echoes are received from a moving target. Then there will be produced at the output from unit A a Doppler frequency $f_d$ due to target motion accompanied by frequency modulation side bands of which the most important—and the only ones that need now be considered—are $f_d+f_r$ and $f_d-f_r$ being the transmitter repetition frequency. At the beginning of a cycle of operation of the exponential source 2 the deviation of the transmitter is very small and those side bands are accordingly of small amplitude compared to that of the Doppler frequency. The loop including the units 15, 18, 19, 20, 21, 17 and 28 operates to cause the frequency $f_1$ from oscillator 28 to lock in to a frequency equal to $f_a+f_d$ where $f_a$ is the centre frequency of unit 18 i.e. the frequency at which unit 19 gives zero output. Now the two outputs $(n+1)f_r$ and $(n-1)f_r$ from the tone wheel generator are changed by frequency changers 38 and 39 into two frequencies $f_1+f_r$ and $f_1-f_r$, $f_1$ being maintained equal to $f_a+f_d$ by the loop including oscillator 28. $f_1+f_r$ and $f_1-f_r$ are therefore equal respectively to $f_a+f_d+f_r$ and $f_a+f_d-f_r$. With these frequencies are mixed, in the frequency changers 42 and 43 respectively, the incoming frequencies $f_d+f_r$ and $f_d-f_r$, so that the outputs from 42 and 43 are each of frequency $f_a$. If the echo time of the target, i.e. the propagation time to the target and back is exactly the same as the repetition period $1/f_r$ of the transmitter (or exactly the same as a multiple thereof) the side bands from the unit A and therefore the outputs from the filters 44 and 45 (of frequency $f_a$) following the units 42 and 43 will be of equal amplitude but if this condition is not satisfied there will be an output from the discriminator 46 such as will alter the frequency of the ranging oscillator 50 to restore the equal amplitude condition. The oscillator 50 is arranged, in the uncontrolled condition, to provide a frequency corresponding to the longest range with which the radar system is designed to deal. Thus the loop including discriminator 46 and ranging oscillator 50 operates automatically to maintain the repetition frequency period equal to the echo time. Although the deviation of the transmitter increases one of the side bands from the unit A nevertheless does not increase its difference in amplitude from the other because, all the time, the synchronous condition, i.e. $1/f_r$ an echo time, is being automatically maintained to a degree of aproximation which becomes increasingly close as the deviation increases. The automatic maintenance of the outputs from the filters 40 and 41 at the required values of $f_1+f_r$ and $f_1-f_r$ is obtained by reason of the fact that the frequency $f_r$ from the oscillator 50 controls the motor 31 and the frequency $f_1$ from the oscillator 28 is compared with the sum of frequency $nf_r$ from the generator 30 and $f_2$ from the oscillator 33 in the detector 29 so as to control oscillator 33 to the required frequency. The range of the target may be read on a suitably calibrated frequency meter 51 reading the frequency of the oscillator 50.

As with FIGURE 1 high speed high resolution range finding is accomplished because the range resolution is rapidly increased due to the increasing deviation of the transmitter over the cycle from the exponential source 2 and the long time which would be necessary if the whole range bracket had to be explored with high resolution is avoided.

We claim:

A frequency modulated wave radar system comprising a transmitter for transmitting continuous waves, means for cyclically varying the frequency of the transmitted waves, means for receiving reflected echo signals, means for mixing reflected echo signal energy with energy derived from the transmitter to produce beat frequency energy, a swept local oscillator, means for mixing said beat frequency energy with energy from said oscillator, a fixed frequency band pass filter, means for applying the resultant of said mixing to said filter, a frequency discriminator, means for feeding the output of said filter to said discriminator, means connecting said discriminator to vary the swept oscillator frequency toward a value at which the resultant of mixing accords with the centre of the pass band of said filter, means for making the degree of control exercised by said discriminator dependent on the rate of change of transmitted frequency for varying the resolution with said rate of change, and means, including means for cyclically varying the rate of change of frequency of said transmitted waves, to increase said rate over a succession of cycles of frequency variation by varying the deviation of said transmitting means.

References Cited in the file of this patent
UNITED STATES PATENTS

| | | |
|---|---|---|
| 2,422,157 | Wolff | June 10, 1947 |
| 2,537,593 | Landon et al. | Jan. 9, 1951 |
| 2,553,907 | Fleming-Williams | May 22, 1951 |
| 2,602,920 | Rust | July 8, 1952 |
| 2,726,383 | Dunn | Dec. 6, 1955 |
| 2,754,510 | Cauchois | July 10, 1956 |